United States Patent
Furuta et al.

(10) Patent No.: US 11,203,117 B2
(45) Date of Patent: Dec. 21, 2021

(54) TEACHING DATA GENERATION SYSTEM FOR VERTICAL MULTI-JOINT ROBOT

(71) Applicant: Keylex Corporation, Hiroshima (JP)

(72) Inventors: Takeshi Furuta, Hiroshima (JP); Fumika Abe, Hiroshima (JP)

(73) Assignee: Keylex Corporation, Hiroshima (JP)

( * ) Notice: Subject to any disclaimer, the term of this patent is extended or adjusted under 35 U.S.C. 154(b) by 85 days.

(21) Appl. No.: 16/849,803

(22) Filed: Apr. 15, 2020

(65) Prior Publication Data

US 2020/0238512 A1 Jul. 30, 2020

Related U.S. Application Data

(63) Continuation of application No. PCT/JP2018/023332, filed on Jun. 19, 2018.

(30) Foreign Application Priority Data

Oct. 20, 2017 (JP) .............................. JP2017203240

(51) Int. Cl.
*B25J 9/16* (2006.01)
*B25J 13/08* (2006.01)

(52) U.S. Cl.
CPC ............. *B25J 9/163* (2013.01); *B25J 9/1664* (2013.01); *B25J 13/088* (2013.01)

(58) Field of Classification Search
CPC ........ B25J 9/163; B25J 9/1664; B25J 13/088; B25J 9/046; B25J 9/126; G05B 19/42
USPC ................................................ 700/245–264
See application file for complete search history.

(56) References Cited

U.S. PATENT DOCUMENTS

| | | | | |
|---|---|---|---|---|
| 4,260,940 A | * | 4/1981 | Engelberger | .......... B23P 21/002 318/562 |
| 4,260,941 A | * | 4/1981 | Engelberger | .......... B23P 21/002 318/568.13 |
| 4,550,383 A | * | 10/1985 | Sugimoto | ................ B25J 9/161 318/568.15 |

(Continued)

FOREIGN PATENT DOCUMENTS

| | | |
|---|---|---|
| EP | 2660014 B1 | 12/2015 |
| JP | 1999-039021 A | 2/1999 |

(Continued)

OTHER PUBLICATIONS

International Search Report, International Application No. PCT/JP2018/023332 dated Sep. 12, 2018, 2 pages.

(Continued)

*Primary Examiner* — Jaime Figueroa
(74) *Attorney, Agent, or Firm* — Nixon Peabody LLP

(57) ABSTRACT

A control point extraction unit ($1d$) is configured to extract, when a center of a joint portion (V) of a fifth rotary shaft (C5) is defined as a control point (A), a position ($P_1$) of the control point (A) for a teaching point ($T_1$) and a position ($P_2$) of the control point (A) for a teaching point ($T_2$). A linear path calculation unit ($1e$) is configured to calculate a linear path (L) that passes through the position ($P_1$) and the position ($P_2$). An arm movement calculation unit ($1f$) is configured to generate teaching data (D1) by calculating a movement of an arm (3) to cause the control point (A) to move along the linear path (L) from the position ($P_1$) to the position ($P_2$).

2 Claims, 11 Drawing Sheets

(56) References Cited

U.S. PATENT DOCUMENTS

| | | | | |
|---|---|---|---|---|
| 4,685,067 | A * | 8/1987 | French | G05B 19/42 318/568.13 |
| 4,836,742 | A * | 6/1989 | Ishiguro | G05B 19/423 414/742 |
| 5,353,386 | A * | 10/1994 | Kasagami | B25J 9/1682 700/247 |
| 8,989,901 | B2 * | 3/2015 | Minami | B25J 9/1682 700/248 |
| 10,556,342 | B2 * | 2/2020 | Fujieda | G05B 19/4069 |
| 2005/0143860 | A1 * | 6/2005 | Nakajima | B25J 9/1643 700/245 |
| 2006/0025890 | A1 * | 2/2006 | Nagatsuka | B25J 9/1671 700/253 |
| 2007/0030271 | A1 * | 2/2007 | Kamiya | B25J 9/1664 345/442 |
| 2007/0118250 | A1 * | 5/2007 | Nagamatsu | B25J 9/1666 700/251 |
| 2009/0234502 | A1 * | 9/2009 | Ueyama | B25J 9/1697 700/259 |
| 2010/0332032 | A1 * | 12/2010 | Moriyama | B25J 9/1682 700/258 |
| 2011/0213497 | A1 * | 9/2011 | Nair | B25J 9/1666 700/255 |
| 2011/0238215 | A1 * | 9/2011 | Yanagawa | G05B 19/42 700/258 |
| 2012/0239194 | A1 * | 9/2012 | Kagawa | B25J 9/1692 700/254 |
| 2015/0290801 | A1 | 10/2015 | Kuwahara | |
| 2016/0271799 | A1 * | 9/2016 | Sugio | B25J 9/1664 |
| 2018/0043525 | A1 * | 2/2018 | Su | B25J 13/081 |
| 2018/0297197 | A1 | 10/2018 | Watanabe | |
| 2018/0345484 | A1 * | 12/2018 | Miyamoto | B25J 19/023 |
| 2019/0129374 | A1 * | 5/2019 | Miyamoto | G05B 19/401 |
| 2019/0134814 | A1 * | 5/2019 | Inomata | B25J 9/042 |
| 2019/0291277 | A1 * | 9/2019 | Oleynik | B25J 9/1669 |

FOREIGN PATENT DOCUMENTS

| | | |
|---|---|---|
| JP | 2000-020120 A | 1/2000 |
| JP | 2015-202523 A | 11/2015 |
| WO | WO 2017/064851 A1 | 4/2017 |

OTHER PUBLICATIONS

Examination Report in Indian Patent Application No. IN 202017016657, dated Jul. 30, 2021 (5 pages).

* cited by examiner

FIG.5

|  | First rotary shaft (140°/s) | Second rotary shaft (110°/s) | Third rotary shaft (130°/s) | Fourth rotary shaft (175°/s) | Fifth rotary shaft (175°/s) | Sixth rotary shaft (225°/s) |
|---|---|---|---|---|---|---|
| Angle(°) | 3.7 | 4.4 | 4.3 | 2.3 | 32.3 | 31.7 |
| Time(sec) | 0.03 | 0.04 | 0.03 | 0.01 | 0.18 | 0.12 |

FIG.6

| | First rotary shaft (140°/s) | Second rotary shaft (110°/s) | Third rotary shaft (130°/s) | Fourth rotary shaft (175°/s) | Fifth rotary shaft (175°/s) | Sixth rotary shaft (225°/s) |
|---|---|---|---|---|---|---|
| Angle (°) | 8.3 | 19.5 | 22.6 | 48.6 | 22.4 | 52.2 |
| Time (sec) | 0.06 | 0.18 | 0.17 | 0.28 | 0.13 | 0.20 |

FIG.8

|  | First rotary shaft (140°/s) | Second rotary shaft (110°/s) | Third rotary shaft (130°/s) | Fourth rotary shaft (175°/s) | Fifth rotary shaft (175°/s) | Sixth rotary shaft (225°/s) |
|---|---|---|---|---|---|---|
| Angle(°) | 13.7 | 10.3 | 15.7 | 10.3 | 18 | 39.8 |
| Time(sec) | 0.10 | 0.09 | 0.12 | 0.06 | 0.10 | 0.16 |

FIG.9

| | First rotary shaft (140°/s) | Second rotary shaft (110°/s) | Third rotary shaft (130°/s) | Fourth rotary shaft (175°/s) | Fifth rotary shaft (175°/s) | Sixth rotary shaft (225°/s) |
|---|---|---|---|---|---|---|
| Angle (°) | 77.6 | 12.9 | 49.6 | 46.4 | 25.3 | 114.9 |
| Time (sec) | 0.55 | 0.12 | 0.38 | 0.27 | 0.14 | 0.45 |

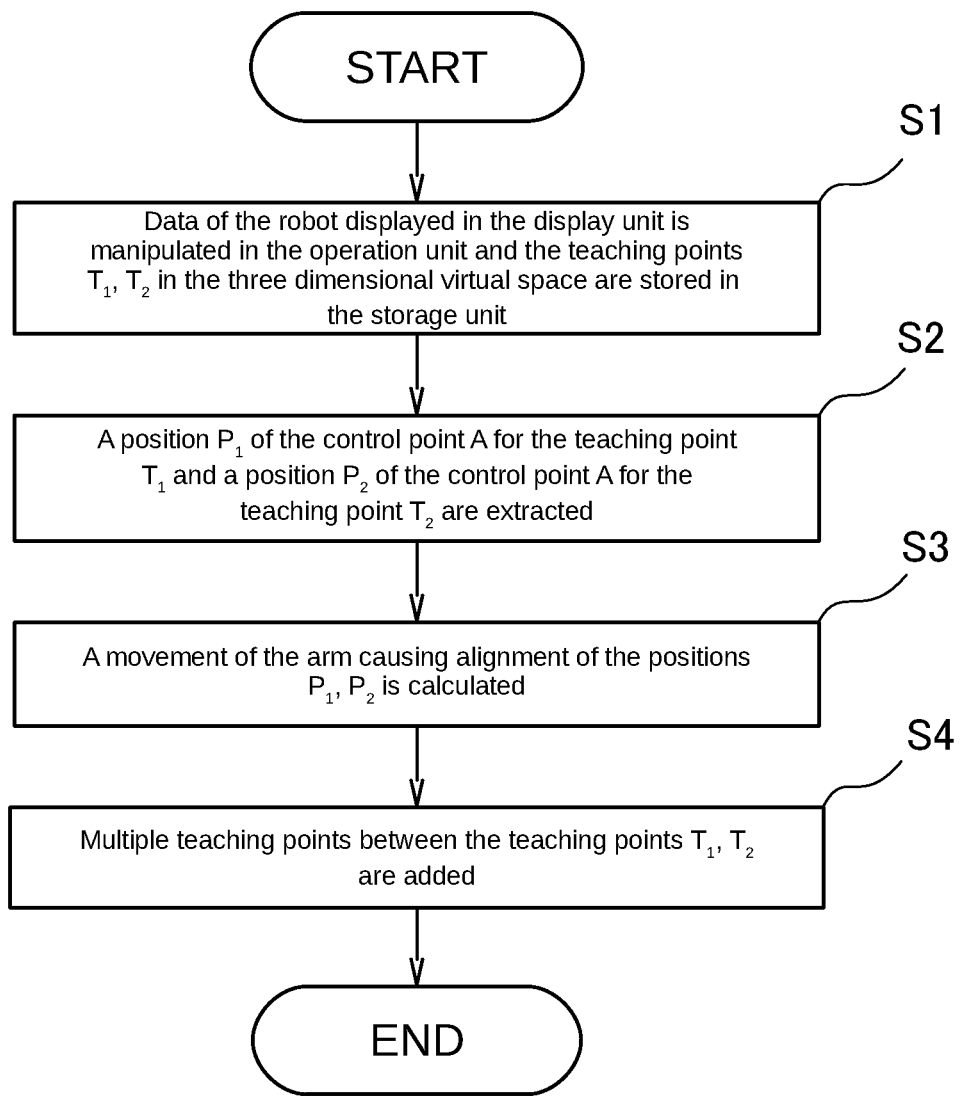

TEACHING DATA GENERATION SYSTEM FOR VERTICAL MULTI-JOINT ROBOT

CROSS-REFERENCE TO RELATED APPLICATION

This application is a continuation of International Application No. PCT/JP2018/023332 filed on Jun. 19, 2018, which is incorporated herein by reference in its entirety and for all purposes.

TECHNICAL FIELD

The present disclosure relates to a teaching data generation system for a vertical multi-joint robot having six axes.

BACKGROUND OF THE DISCLOSURE

Conventionally, in a production plant for automobiles, etc., a large number of vertical multi-joint robots perform tasks instead of human. These vertical multi-joint robots play back movements based on pre-generated teaching data. In recent years, this teaching data is first generated while a pose of a robot is assessed on a three dimensionally displayed robot as data using a workstation or computer in offline operation, and subsequently the generated teaching data is written to a controller of a robot installed in a production plant for use, as described in, for example, Japanese laid-open patent publication No. 2000-20120.

SUMMARY OF THE INVENTION

As the teaching data as described above is generated in offline operation, the teaching data is generally created, on one hand, to prioritize storing of operation positions in a three dimensional space as teaching points for a tool attached to a distal end of an arm of the robot as well as avoidance of interference of the tool and arm with a workpiece and other equipment, etc., between the teaching points, and on the other hand, to neglect details of poses of the arm between the teaching points. In that way, the teaching data is created including a large number of unnecessary motions of the arm between the teaching points. When the teaching data is written to a controller of a robot placed in a production plant to move the robot, movements of the robot may not be finished within desired cycle time due to the unnecessary motions of the arm between the teaching points. In that case, an operator needs to assess visually the movements of the robot actually in a production site and to correct manually the unnecessary motions of the arm while repeating trial and error, in order to finish the movements of the robot within the desired cycle time. This leads to an issue of inefficiency.

The present disclosure is made in view of the foregoing and an object of the present disclosure is to provide a teaching data generation system for a vertical multi-joint robot which can reduce correction of movements of the robot by an operator in a production site to improve operation efficiency.

To achieve the object, the present disclosure is characterized by devising generation of teaching data by utilizing faster motion of joint portions of an arm on a distal end side than that of joint portions of the arm on a base end side in a vertical multi joint robot.

Specifically, the present disclosure is directed to a teaching data generation system for a vertical multi-joint robot having a multi-joint arm that includes first to sixth rotary shafts provided in turn from a mount floor side, and being able to move based on teaching data that is generated to move a predetermined position of a tool attached to a distal end of the arm among multiple teaching points in turn. The following solutions are then applied.

According to a first aspect of the present disclosure, the teaching data generation system includes a control point extraction unit configured to extract, when a center of a joint portion V for one of the fourth, fifth, and sixth rotary shafts of the arm is defined as a control point A and two predetermined teaching points are defined as $T_1$ and $T_2$, a position $P_1$ of the control point A for the teaching point $T_1$ and a position $P_2$ of the control point A for the teaching point $T_2$; a linear path calculation unit configured to calculate a linear path L passing through the position $P_1$ and the position $P_2$; and an arm movement calculation unit configured to generate teaching data by calculating a movement of the arm to cause the position $P_1$ and the position $P_2$ to align with each other, or to cause the control point A to move along the linear path L or along a pathway proximate to the linear path L from the position $P_1$ to the position $P_2$, when creating the teaching data to move the predetermined position of the tool from the teaching point $T_1$ to the teaching point $T_2$.

According to a second aspect of the present disclosure which is an embodiment of the first aspect, an arm base end side motor is mounted to a joint portion W of one of the first, second and third rotary shafts in the arm, the arm base end side motor configured to generate rotation motion of the joint portion W at an angular velocity $\omega_1$, and an arm distal end side motor is mounted to the joint portion V of one of the fourth, fifth, and sixth rotary shafts in the arm, the arm distal end side motor configured to generate rotation motion of the joint portion V at an angular velocity $\omega_2$ that is x times the angular velocity $\omega_1$, wherein the arm movement calculation unit is configured to calculate the movement of the arm to have an operation angle $\omega_1$ of the joint portion W being 1/X times an operation angle $\theta_2$ of the joint portion V when calculating the movement of the arm to cause the control point A to reach the position $P_2$ from the position $P_1$.

According to the first aspect of the present disclosure, when the tool is moved between the teaching points due to the movement of the robot based on the teaching data, only the joint portions located at the distal end side of the arm rotate as the control point A is stationary, and the joint portions located at the distal end side of the arm have substantially larger rotation angles than the joint portions located at the base end side of the arm to maintain a linear movement of the control point A as the control point A moves linearly. Accordingly, the motors with larger angular velocity out of the motors that rotate the respective joint portions of the arm have longer operation time, thereby enabling shorter operation time of the overall arm and reduced unnecessary movements of the arm between the teaching points. An operator thus performs less tasks of assessing visually the movement of the robot actually in a production site and of correcting manually the unnecessary motions of the arm while repeating trial and error, providing higher operation efficiency.

According to the second aspect of the present disclosure, when the tool is moved between the teaching points due to the movement of the robot based on the teaching data, times spent for the movements of the joint portion V of the arm with a larger angular velocity and of the joint portion W of the arm with a smaller angular velocity are averaged. Accordingly, operation times of the joint portions V, W are substantially equal, enabling the joint portions V, W to have reduced resting and free time. The arm thus performs further efficient movements, allowing further shorter operation time of the overall arm when the tool is moved between the teaching points.

BRIEF DESCRIPTION OF THE DRAWINGS

FIG. 5 shows rotation angles around first to sixth rotation axes of an arm and times spent for the respective rotations when a welding gun is moved as shown with an arrow R1 in FIG. 4.

FIG. 6 shows rotation angles around first to sixth rotation axes of an arm and times spent for the respective rotations when a welding gun is moved as shown with an arrow R2 in FIG. 4.

FIG. 8 shows rotation angles around first to sixth rotation axes of an arm and times spent for the respective rotations when a welding gun is moved as shown with an arrow S1 in FIG. 7.

FIG. 9 shows rotation angles around first to sixth rotation axes of an arm and times spent for the respective rotations when a welding gun is moved as shown with an arrow S2 in FIG. 7.

FIG. 11 is a flow diagram of generating teaching data by using a teaching data generation system according to the second embodiment of the present disclosure.

DETAILED DESCRIPTION

Embodiments of the present disclosure will now be described in detail with reference to the drawings. It is noted that the following description of preferred embodiments is merely an example in nature.

First Embodiment of Disclosure

Figure 1:
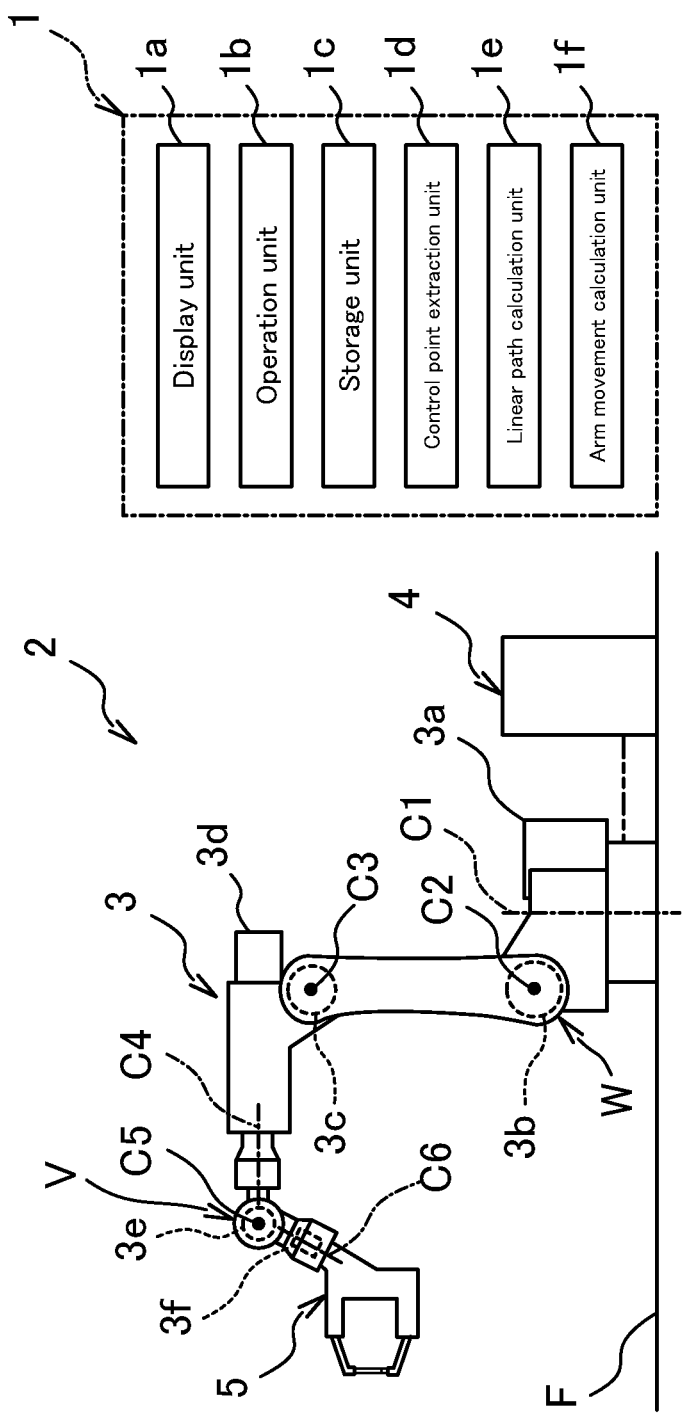
FIG. 1 is a schematic representation of a teaching data generation system according to a first embodiment of the present disclosure and a vertical multi-joint robot playing back a movement based on teaching data generated in the system.

FIG. 1 illustrates a teaching data generation system 1 and a vertical multi joint robot 2 according to a first embodiment of the present disclosure. The robot 2 includes an arm 3 installed on a mount floor F and a control panel 4 coupled to the arm 3. The arm 3 has a distal end portion to which a welding gun 5 (tool) of spot welding is attached.

The arm 3 has six axes and is thus multi-jointed, in which first to sixth rotary shafts C1 to C6 are provided in turn from a mount floor F side. First to sixth drive motors $3a$ to $3f$ are mounted to respective joint portions of the first to sixth rotary shafts C1 to C6. The first to sixth drive motors $3a$ to $3f$ rotate the respective joint portions about the first to sixth rotary shafts C1 to C6.

The second drive motor $3b$ (arm base end side motor) mounted to a joint portion W of the second rotary shaft C2 is configured to rotate the joint portion W at an angular velocity $\omega_1$.

The fifth drive motor $3e$ (arm distal end side motor) mounted to a joint portion V of the fifth rotary shaft C5 is then configured to rotate the joint portion V at an angular velocity $\omega_2$, wherein the angular velocity $\omega_1$ is x times the angular velocity $\omega_2$.

The robot 2 then performs a movement based on teaching data D1 written to the control panel 4.

The teaching data generation system 1 is used for generating the teaching data D1 in offline operation. The teaching data generation system 1 includes a display unit $1a$, an operation unit $1b$, a storage unit $1c$, a control point extraction unit $1d$, a linear path calculation unit $1e$, and an arm movement calculation unit $1f$. FIG. 1 shows minimum elements necessary for explanation of the teaching data generation system 1, and other general elements are omitted.

Figure 2:
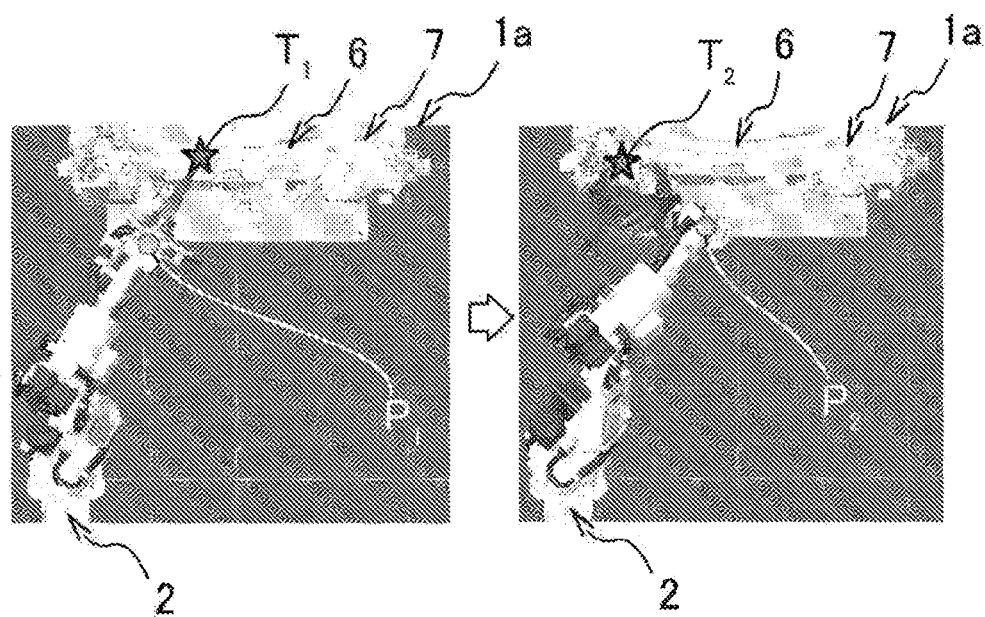
FIG. 2 is a view illustrating a welding position of a workpiece and a primary pose of a robot on teaching data generated by using a teaching data generation system according to the first embodiment of the present disclosure.

As illustrated in FIG. 2, the display unit $1a$ can display modeling data of the robot 2, of a workpiece 6 that is welded, and of a fixture 7, etc. The modeling data of a robot 2, workpiece 6, and fixture 7 shown in the display unit $1a$ have reference characters same as the robot 2, the workpiece 6, and the fixture 7.

The modeling data of the robot 2 displayed in the display unit $1a$ can be manipulated in the operation unit $1b$. An operator can assign, while operating the operation unit $1b$, in a three dimensional virtual space multiple teaching points $T_n$ (wherein n is a natural number) that are positions at which the welding gun 5 performs welding.

The storage unit $1c$ stores the modeling data of the robot 2, the workpiece 6, and the fixture 7, and, for example, teaching data D1 for reproducing a movement of the arm 3 to move the welding gun 5 among the teaching points $T_n$ in turn.

When the joint portion V of the fifth rotary shaft C5 of the arm 3 has a center that is defined as a control point A and the modeling data of the workpiece 6 fixed to the modeling data of the fixture 7 has two predetermined welding points that are defined as teaching points $T_1$ and $T_2$, the control point extraction unit $1d$ extracts the control point A for the teaching point $T_1$ as a position $P_1$ and the control point A for the teaching point $T_2$ as a position $P_2$.

Figure 4:
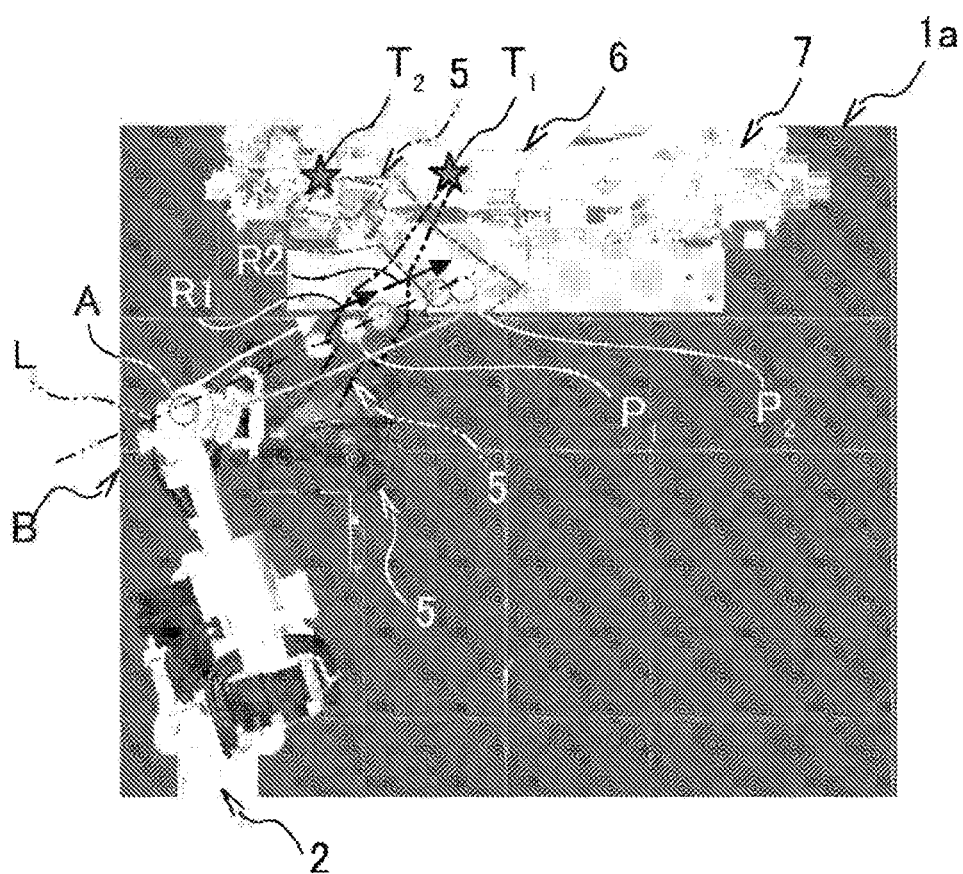
FIG. 4 is a simplified view of a robot moving based on teaching data generated by using a teaching data generation system according to the first embodiment of the present disclosure.

The linear path calculation unit $1e$ calculates a linear path L passing through the position $P_1$ and the position $P_2$ in a three dimensional space (see FIG. 4). Thus, when the linear path L is defined as coordinates (x, y, z), the position $P_1$ is defined as coordinates $(a_1, b_1, c_1)$, and the position $P_2$ is defined as coordinates $(a_2, b_2, c_2)$, the linear path L is calculated by using the following formula (1).

$$L(a_1, b_1, c_1) + t(a_2 - a_1, b_2 - b_1, c_2 - c_1) \tag{1}$$

As illustrated in FIG. 4, when teaching data D1 is created to move the welding gun 5 from the teaching point $T_1$ to the teaching point $T_n$, the arm movement calculation unit if generates the teaching data D1 by calculating a movement of the arm 3 to cause the control point A to move along the linear path L or along a pathway proximate to the linear path L from the position $P_1$ to the position $P_2$.

Specifically, the calculation determines an additional necessary teaching point to enable the control point A to move along the linear path L or along a pathway proximate to the linear path L, between the teaching point $T_1$ and the teaching point $T_2$.

The teaching data D1 generated in the teaching data generation system 1 is then written to the control panel 4 to be used for a playback movement of the robot 2.

Next, a method for generating teaching data D1 by using the teaching data generation system 1 will be described in detail.

As illustrated in FIG. 4, the teaching data D1 that is generated is a series of movements of the robot 2 causing the welding gun 5 to move from an original position B to a teaching point $T_1$ for performing welding, followed by to move to a teaching point $T_2$ with the robot 2 changing its pose for performing welding, and subsequently, to return to the original position B.

Figure 3:
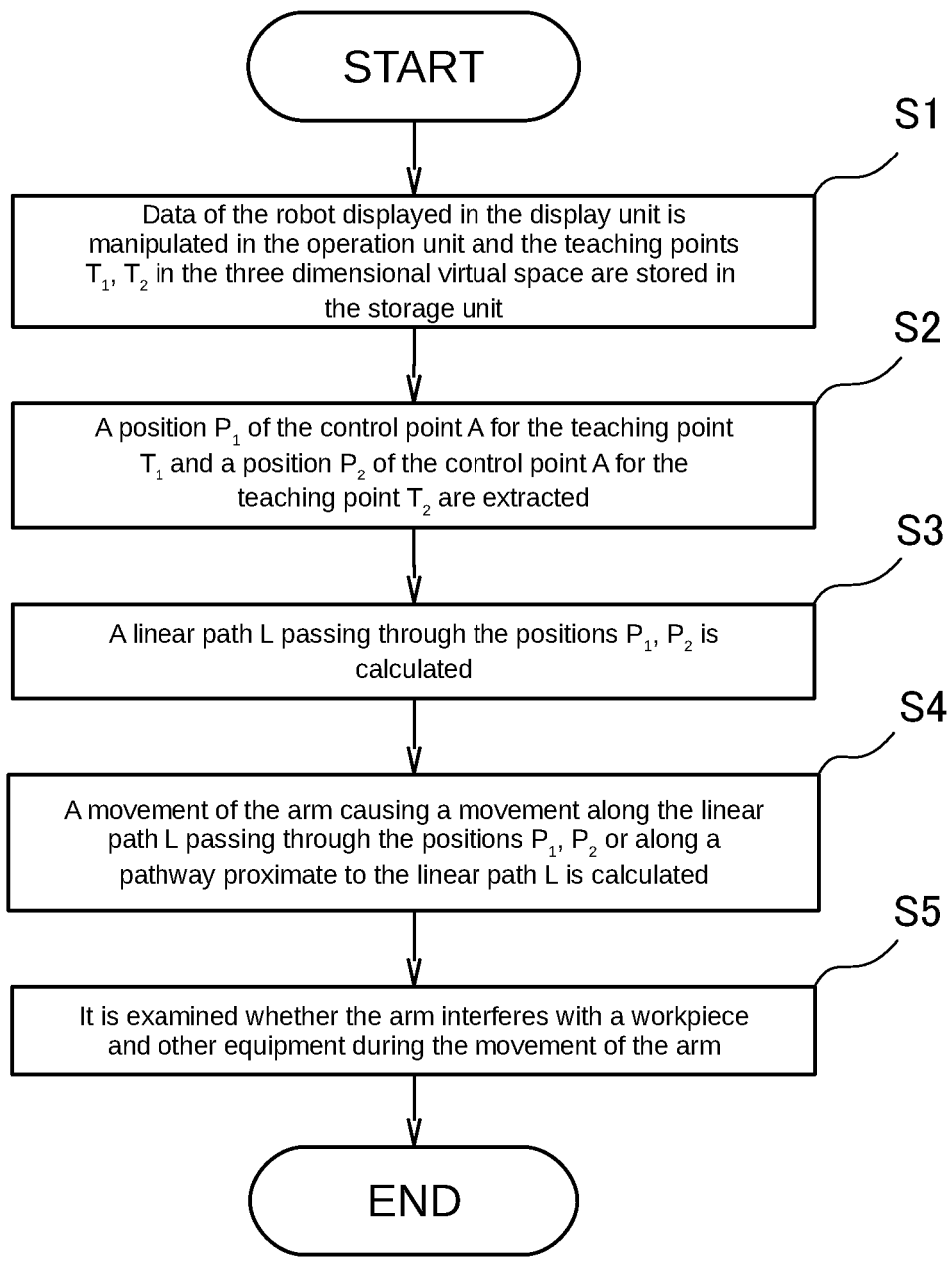
FIG. 3 is a flow diagram of generating teaching data by using a teaching data generation system according to the first embodiment of the present disclosure.

As shown in FIG. 3, first, at step S1 modeling data of the robot 2 displayed in the display unit 1a is manipulated in the operation unit 1b and the teaching points $T_1$, $T_2$ in the three dimensional virtual space are stored in the storage unit 1c.

Next, as the method moves forward to step S2, a position $P_1$ of the control point A for the teaching point $T_1$ and a position $P_2$ of the control point A for the teaching point $T_2$ are extracted in the control point extraction unit 1d.

Then, as the method moves forward to step S3, a linear path L passing through the position $P_1$ and the position $P_2$ is calculated in the linear path calculation unit 1e.

Subsequently, as the method moves forward to step S4, the teaching data D1 is created in the arm movement calculation unit 1f by calculating a movement of the arm 3 to cause the control point A to move along the linear path L or along a pathway proximate to the linear path L from the position $P_1$ to the position $P_2$.

Then, at step S5, an operator examines in the display unit 1a whether the arm 3 and the welding gun 5 interfere with the workpiece 6 and the fixture 7 during the movement of the arm 3. If there is the interference, the operator performs fine adjustment of the path of the movement for the arm 3 to finish generating the teaching data D1.

Next, results of comparative evaluation between movements on modeling data of the robot 2 using teaching data D1 generated in the teaching data generation system 1 and on modeling data of the robot 2 using teaching data generated in a conventional method will be described in detail.

FIG. 4 illustrates in a simplified manner the movement on the modeling data of the robot 2 using the teaching data D1 generated in the teaching data generation system 1. Multiple positions of the control point A in the course of the movement during the series of movements of the robot 2 are plotted, showing the control point A moving along the linear path L.

FIG. 5 shows times spent for rotation motions of respective joint portions of the arm 3 around the first to sixth rotary shafts C1 to C6 when the modeling data of the robot 2 is moved as shown with an arrow R1 in FIG. 4. It took 0.18 seconds of time until the movement shown as the arrow R1 was finished.

FIG. 6 shows times spent for rotation motions of respective joint positions of the arm 3 around the first to sixth rotary shafts C1 to C6 when the modeling data of the robot 2 is moved as shown with an arrow R2 in FIG. 4. It took 0.28 seconds of time until the movement shown as the arrow R2 was finished.

Thus, for the teaching data D1 generated in the teaching data generation system 1, operation time of the modeling data of the robot 2 taken for the welding gun 5 to reach the teaching point $T_2$ from the teaching point $T_1$ was 0.46 seconds.

Figure 7:
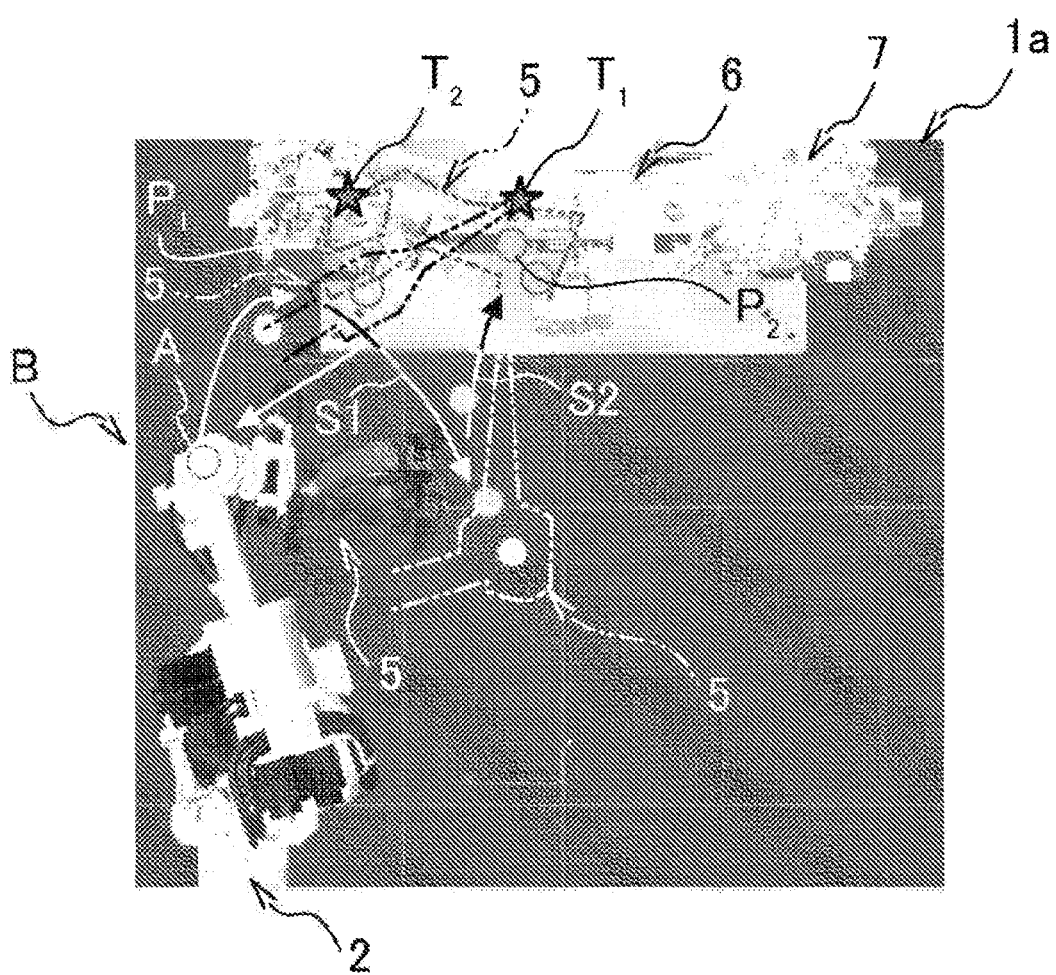
FIG. 7 is a simplified view of a movement of a robot on teaching data generated by using a conventional method.

On the other hand, FIG. 7 illustrates in a simplified manner the movement of the modeling data of the robot 2 using teaching data generated in the conventional method. The robot 2 moves to withdraw temporarily the welding gun 5 from the workpiece 6 and the fixture 7 to prevent the welding gun 5 from interfering with the workpiece 6 and the fixture 7 while the welding gun 5 moves from the teaching point $T_1$ to the teaching point $T_2$. Then, multiple positions of the control point A in the course of the movement during the series of movements of the robot 2 are plotted, showing the control point A not moving linearly.

FIG. 8 shows times spent for rotation motions of respective joint positions of the arm 3 around the first to sixth rotary shafts C1 to C6 when the modeling data of the robot 2 is moved as shown with an arrow S1 in FIG. 7. It took 0.16 seconds of time until the movement shown as the arrow S1 was finished.

FIG. 8 shows times spent for rotation motions of respective joint positions of the arm 3 around the first to sixth rotary shafts C1 to C6 when the modeling data of the robot 2 is moved as shown with an arrow S2 in FIG. 7. It took 0.55 seconds of time until the movement shown as the arrow S2 was finished.

Thus, for the teaching data generated in the conventional method, operation time of the modeling data of the robot 2 taken for the welding gun 5 to reach the teaching point $T_2$ from the teaching point $T_1$ was 0.71 seconds. The generation of teaching data D1 by using the teaching data generation system 1 of the present disclosure is found to enable the robot 2 to have less unnecessary movements.

According to the first embodiment of the present disclosure, when the welding gun 5 is moved between the teaching point $T_1$ and the teaching point $T_2$ due to the movement of the robot 2 that is based on the teaching data D1, the joint portions located at a distal end side of the arm 3 have substantially larger rotation angles than the joint portions located at a base end side of the arm 3 to maintain a linear movement of the control point A. Accordingly, the drive motors with larger angular velocity out of the first to sixth drive motors 3a to 3f that rotate the respective joint portions of the arm 3 have longer operation time, thereby enabling shorter operation time of the overall arm 3 and reduced unnecessary movements of the arm 3 between the teaching point $T_1$ and the teaching point $T_2$. An operator thus performs less tasks of assessing visually the movement of the robot 2 actually in a production site and of correcting manually the unnecessary motions of the arm 3 while repeating trial and error, providing higher operation efficiency.

The arm movement calculation unit 1f may be configured to calculate the movement of the arm 3 such that an operation angle $\theta_1$ of the joint portion W is 1/X times an operation angle $\theta_2$ of the joint portion V when the arm movement calculation unit 1f calculates the movement of the arm 3 to cause the control point A to reach the position $P_2$ from the position $P_1$.

Specifically, in the case of the first embodiment of the present disclosure, the angular velocity $\omega_2$ of the joint portion V of the fifth rotary shaft C5 is 1.6 times the angular velocity $\omega_1$ of the joint portion W of the second rotary shaft C2 for the movement. The movement of the arm 3 may be thus calculated such that the operation angle $\theta_2$ of the joint portion V is 1.6 times the operation angle $\theta_1$ of the joint portion W when the welding gun 5 reaches the teaching point $T_2$ from the teaching point $T_1$. As a result, the times spent for the movement of the joint portion V of the arm 3 with a larger angular velocity and for the movement of the joint portion W of the arm 3 with a smaller angular velocity are averaged, so that the operation times of the joint portions V, W are substantially equal, enabling the joint portions V, W to have reduced resting and free time. Accordingly, the arm 3 performs further efficient movements, allowing further shorter operation time of the overall arm 3 when the welding gun 5 is moved between the teaching point $T_1$ and the teaching point $T_2$.

Second Embodiment of Disclosure

Figure 10:
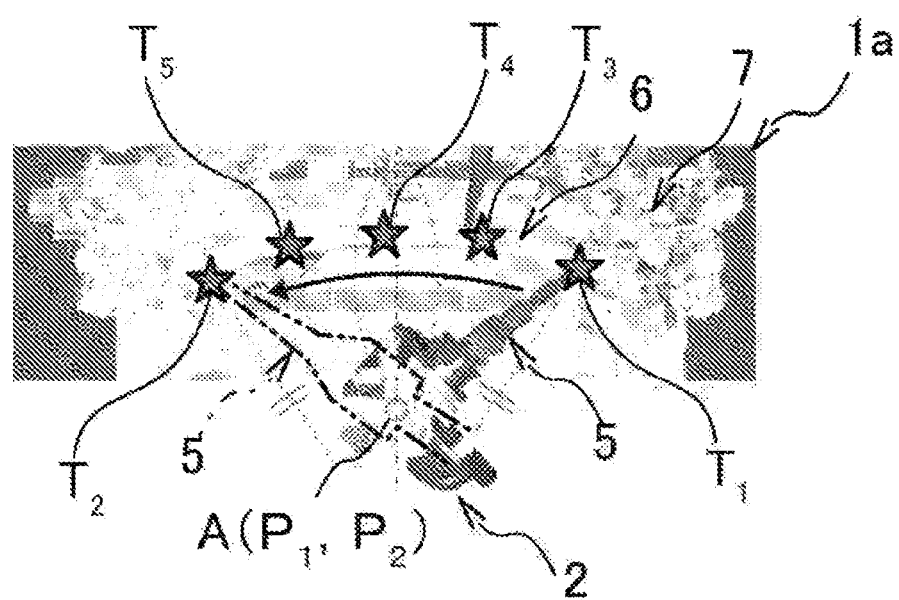
FIG. 10 is a simplified view illustrating a movement of a robot on teaching data generated by using a teaching data generation system according to a second embodiment of the present disclosure, showing a state of movement without displacing a center of a joint portion of a fifth rotary shaft in an arm.

FIG. 10 illustrates in a simplified manner modelling data of a robot 2 configured to move based on teaching data D1 generated by using a teaching data generation system 1 according to a second embodiment of the present disclosure. The second embodiment differs from the first embodiment only in positions of teaching points $T_1$, $T_2$ with respect to modelling data of a workpiece 6, a process of an arm movement calculation unit 1f, and part of steps of a flow diagram, while being the same as the first embodiment in connection with other aspects. Only aspects different from the first embodiment will be explained below.

The teaching data D1 that is generated in the second embodiment is a series of movements of the robot 2 that performs welding at multiple welding positions with the robot 2 changing a pose of a welding gun 5 from one side of a workpiece 6 toward the other side, wherein the workpiece 6 is vertically symmetrical on the page of FIG. 10.

An arm movement calculation unit 1f of the second embodiment calculates a movement of an arm 3 to align a position $P_1$ and a position $P_2$ when generating the teaching data D1 to move the welding gun 5 from a teaching point $T_1$ to a teaching point $T_2$.

Specifically, the calculation determines a position in a three dimensional space at which the position $P_1$ and the position $P_2$ align with each other, and an additional necessary teaching point (welding position) to enable the movement of the arm 3 such that a control point A does not move between the teaching point $T_1$ and the teaching point $T_2$.

Next, a method for generating teaching data D1 using the teaching data generation system 1 according to the second embodiment of the present disclosure will be described in detail. The method is same as the first embodiment in step S2 and earlier, and therefore, only step S3 and later will be explained.

As illustrated in FIG. 11, at step S3 of the second embodiment, the teaching data D1 is created in the arm movement calculation unit if by calculating a movement of the arm 3 to align the position $P_1$ and the position $P_2$ of the control point A.

Then, as the method moves forward to step S4, three different poses in the course of the calculated movement of the arm 3 are extracted and a storage unit 1c stores positions of the three poses as teaching points $T_3$ to $T_5$ at which the welding gun 5 performs welding, to finish generating the teaching data D1.

According to the second embodiment of the present disclosure, when the welding gun 5 moves from the teaching point $T_1$ to the teaching point $T_2$ due to the movement of the robot 2 that is based on the teaching data D1, the control point A does not move, so that only joint portions located at a distal end side of the arm 3 rotate. Accordingly, in a similar way to the first embodiment, drive motors with larger angular velocity out of first to sixth drive motors 3a to 3f that rotate joint portions of the arm 3 have longer operation time, thereby enabling shorter operation time of the overall arm 3 and reduced unnecessary movements of the arm 3 between the teaching point $T_1$ and the teaching point $T_2$. An operator thus performs less tasks of assessing visually a movement of the robot 2 actually in a production site and of correcting manually unnecessary motions of the arm 3 while repeating trial and error, providing higher operational efficiency.

Further, the teaching data generation system 1 according to the first and second embodiments of the present disclosure creates teaching data for a movement of the robot 2 in which the welding gun 5 is attached to a distal end of the arm 3, but is not limited to this configuration and can also create teaching data for a movement of the robot 2 in which material handling equipment, etc., is attached to a distal end of an arm.

In the first and second embodiments of the present disclosure, an operation point A is set at a center of the joint portion of the fifth rotary shaft C5; however, the operation point A may be set at a center of the joint portion of the fourth rotary shaft C4 or at a center of the joint portion of the sixth rotary shaft C6.

In the first and second embodiments of the present disclosure, the joint portion W having the angular velocity $\omega_1$ that is 1/X times the angular velocity $\omega_2$ of the joint portion V is the joint portion of the second rotary shaft C2; however, the joint portion W can be the joint portion of the first rotary shaft C1 or of the third rotary shaft C3.

The present disclosure is suitable for a teaching data generation system for a vertical multi-joint robot having six axes.

The invention claimed is:

1. A teaching data generation system for a vertical multi-joint robot having a multi-joint arm that includes first to sixth rotary shafts provided in turn from a mount floor side and being able to move based on teaching data generated to move a predetermined position of a tool attached to a distal end of the arm among multiple teaching points in turn, comprising
  a control point extraction unit configured to extract, when a center of a joint portion V for one of the fourth, fifth, and sixth rotary shafts of the arm is defined as a control point A and two predetermined teaching points are defined as $T_1$ and $T_2$, a position $P_1$ of the control point A for the teaching point $T_1$ and a position $P_2$ of the control point A for the teaching point $T_2$;
  a linear path calculation unit configured to calculate a linear path L passing through the position $P_1$ and the position $P_2$; and
  an arm movement calculation unit configured to generate teaching data by calculating a movement of the arm to cause the position $P_1$ and the position $P_2$ to align with each other, or to cause the control point A to move along the linear path L or along a pathway proximate to the linear path L from the position $P_1$ to the position $P_2$, when creating the teaching data to move the predetermined position of the tool from the teaching point $T_1$ to the teaching point $T_2$.

2. The teaching data generation system for the vertical multi-joint robot according to claim 1,
  wherein an arm base end side motor is mounted to a joint portion W of one of the first, second and third rotary shafts in the arm, the arm base end side motor configured to generate rotation motion of the joint portion W at an angular velocity $\omega_1$,
  an arm distal end side motor is mounted to the joint portion V of one of the fourth, fifth and sixth rotary shafts in the arm, the arm distal end side motor configured to generate rotation motion of the joint portion V at an angular velocity $\omega_2$ that is x times the angular velocity $\omega_1$, and the arm movement calculation unit is configured to calculate the movement of the arm to have an operation angle $\theta_1$ of the joint portion W being 1/X times an operation angle $\theta_2$ of the joint portion V when calculating the movement of the arm to cause the control point A to reach the position $P_2$ from the position $P_1$.

* * * * *